US012701167B2

(12) United States Patent
Röll et al.

(10) Patent No.: US 12,701,167 B2
(45) Date of Patent: Aug. 4, 2026

(54) SECURE REMOTE ACCESS FOR CLOUD-BASED INDUSTRIAL AUTOMATION

(71) Applicant: Software Defined Automation GmbH, Garching bei München (DE)

(72) Inventors: Philipp Röll, Munich (DE); Philip Ketterer, Munich (DE); Lucas De Camargo Souza, Munich (DE)

(73) Assignee: SOFTWARE DEFINED AUTOMATION GMBH, Garching bei München (DE)

( * ) Notice: Subject to any disclaimer, the term of this patent is extended or adjusted under 35 U.S.C. 154(b) by 0 days.

(21) Appl. No.: 19/110,814

(22) PCT Filed: Oct. 25, 2024

(86) PCT No.: PCT/EP2024/080249
§ 371 (c)(1),
(2) Date: Mar. 12, 2025

(87) PCT Pub. No.: WO2025/088133
PCT Pub. Date: May 1, 2025

(65) Prior Publication Data
US 2026/0012511 A1      Jan. 8, 2026

(30) Foreign Application Priority Data
Oct. 25, 2023    (DE) .................... 10 2023 210 561.6

(51) Int. Cl.
*H04L 67/141*          (2022.01)
*G05B 19/418*          (2006.01)
(Continued)

(52) U.S. Cl.
CPC ........ *H04L 67/141* (2013.01); *G05B 19/4185* (2013.01); *H04L 63/0272* (2013.01); *H04L 67/125* (2013.01)

(58) Field of Classification Search
None
See application file for complete search history.

(56) References Cited

U.S. PATENT DOCUMENTS

| | | | | |
|---|---|---|---|---|
| 2010/0174812 A1* | 7/2010 | Thomas | ................ | G06F 21/305 709/224 |
| 2015/0074749 A1 | 3/2015 | Vasko et al. | | |

(Continued)

FOREIGN PATENT DOCUMENTS

| | | |
|---|---|---|
| EP | 4366238 A1 | 5/2024 |
| EP | 4369659 A1 | 5/2024 |
| WO | WO 2023/198280 A1 | 10/2023 |

OTHER PUBLICATIONS

Givehchi, Omid et al.; "Control-as-a-Service from the Cloud: A Case Study for using Virtualized PLCs"; *10th IEEE Workshop on Factory Communication Systems*; Jun. 19, 2014; pp. 1-4; IEEE; Piscataway, NJ, USA.

*Primary Examiner* — Fadi Haj Said
(74) *Attorney, Agent, or Firm* — LEYDIG, VOIT & MAYER, LTD.

(57) ABSTRACT

The present disclosure relates to a method for establishing a secure remote access, SRA, connection between a cloud computing system, CCS, and an industrial automation system, IAS, the method comprising: receiving, by an SRA server component of the CCS, a first SRA connection establishment message from a first SRA client of the CCS or from a second SRA client of a user device connected to the CCS; receiving, by a connection orchestrator component of the CCS, an indication to establish the SRA connection between the CCS and the IAS, sending, by the connection orchestrator component and based at least in part on the indication, a machine-to-machine network protocol message to a third SRA client of the IAS comprising information for establishing the SRA connection between the IAS and the (Continued)

CCS, and receiving, by the SRA server component of the CCS, a second SRA connection establishment message from the third SRA client of the IAS, and establishing, via the SRA server component, the secure SRA connection between the first SRA client of the CCS and the third SRA client of the IAS or between the second SRA client of the user device and the third SRA client of the IAS. The present disclosure also relates to a corresponding computing system and a computer program.

16 Claims, 6 Drawing Sheets

(51) Int. Cl.
  H04L 9/40           (2022.01)
  H04L 67/125         (2022.01)

(56)                    References Cited

U.S. PATENT DOCUMENTS

| 2017/0208038 | A1 * | 7/2017 | Hinaman | H04L 63/083 |
| 2019/0089741 | A1 | 3/2019 | Hill | |
| 2022/0103517 | A1 | 3/2022 | Luotojärvi et al. | |
| 2022/0353244 | A1 | 11/2022 | Kahn et al. | |
| 2023/0017142 | A1 | 1/2023 | Dunn et al. | |
| 2023/0231845 | A1 * | 7/2023 | Manoharan | H04L 63/0853 726/3 |
| 2024/0231333 | A9 * | 7/2024 | Nixon | G05B 19/4185 |

* cited by examiner

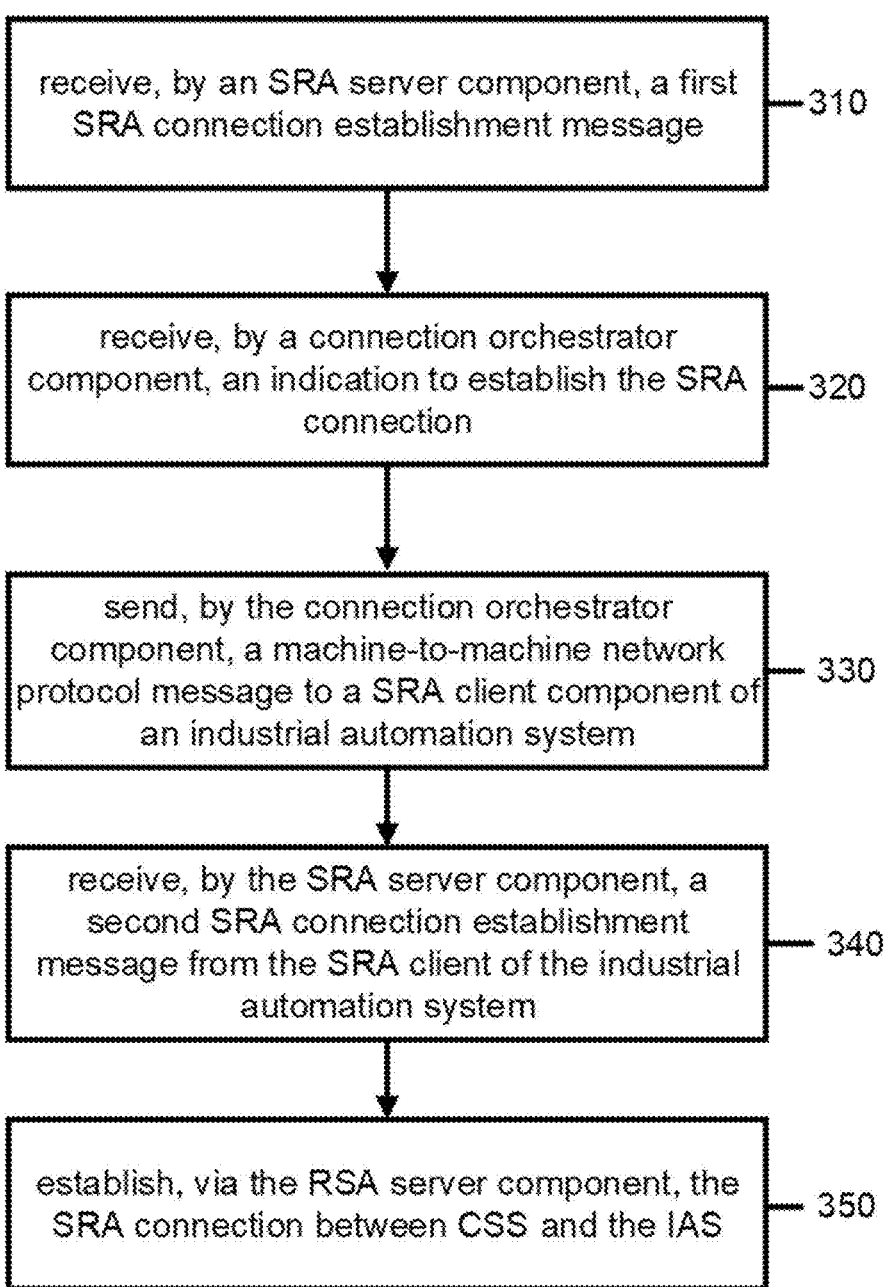

receive, by an SRA server component, a first SRA connection establishment message ——310 receive, by a connection orchestrator component, an indication to establish the SRA connection ——320 send, by the connection orchestrator component, a machine-to-machine network protocol message to a SRA client component of an industrial automation system ——330 receive, by the SRA server component, a second SRA connection establishment message from the SRA client of the industrial automation system ——340 establish, via the RSA server component, the SRA connection between CSS and the IAS ——350

Fig. 3 generate a controller program and / or a controller configuration for an industrial controller — 410 establish an SRA connection between the CCS and the IAS — 420 send, using the SRA connection, the controller program and / or controller configuration to the industrial controller — 430

SECURE REMOTE ACCESS FOR CLOUD-BASED INDUSTRIAL AUTOMATION

CROSS REFERENCE TO RELATED APPLICATIONS

This application is a U.S. National Phase application under 35 U.S.C. § 371 of International Application No. PCT/EP2024/080249, filed on Oct. 25, 2024, and claims benefit to German Patent Application No. DE 10 2023 210 561.6, filed on Oct. 25, 2023.

FIELD

The present disclosure relates to systems, methods and software for establishing a secure remote access (SRA) connection between a cloud computing system (CCS) and an industrial automation system (IAS). Such an SRA connection can be used for configuring industrial controllers of the IAS securely from the cloud, e.g., via an integrated development environment (IDE) hosted in the cloud and accessible via a web interface.

BACKGROUND

In today's rapidly evolving manufacturing industry, automation plays a crucial role in increasing efficiency and productivity on the one hand and reducing downtime on the other. To achieve this, remote access to industrial automation devices is essential, enabling manufacturers to control and update their devices from anywhere, at any time. However, enabling remote access to automation equipment is often a challenging task due to various factors, including high cybersecurity requirements, proprietary third-party communication protocols, and complex network architectures.

In this context, US 2021/0356944 A1 relates to system and methods for providing centralized management of a software defined automation (SDA) system. The described SDA system comprises a collection of controller nodes and logically centralized and yet physically distributed collection of compute nodes. Further, O. Givehchi, J. Imtiaz, H. Trsek and J. Jasperneite, "*Control-as-a-service from the cloud: A case study for using virtualized PLCs*" in 10th IEEE Workshop on Factory Communication Systems, 2014 relates to the concept of implementing a PLC as a service within a cloud-based infrastructure and discusses performance of such cloud-based PLCs with respect to legacy PLCs.

Applicant's WO2023/198280 A1 discloses a cloud computing system, as well as a related method and computer program for configuring and optimizing performance of industrial automation systems from the cloud.

SUMMARY

In an embodiment, the present disclosure provides a method for establishing a secure remote access (SRA) connection between a cloud computing system (CCS) and an industrial automation system (IAS). An SRA server component of the CCS receives a first SRA connection establishment message from a first SRA client component of the CCS or from a second SRA client component of a user device connected to the CCS. A connection orchestrator component of the CCS receives an indication to establish the SRA connection between the CCS and the IAS. The connection orchestrator component sends, based at least in part on the indication, a machine-to-machine network protocol message to a third SRA client component of the IAS comprising information for establishing the SRA connection between the IAS and the CCS. The SRA server component of the CCS receives a second SRA connection establishment message from the third SRA client component of the IAS. The SRA connection is established, via the SRA server component of the CCS, between the first SRA client component of the CCS and the third SRA client component of the IAS or between the second SRA client component of the user device and the third SRA client component of the IAS.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3: a process flow diagram of a method for establishing an SRA connection between a CCS and an IAS as disclosed herein;

DETAILED DESCRIPTION

Figure 1:
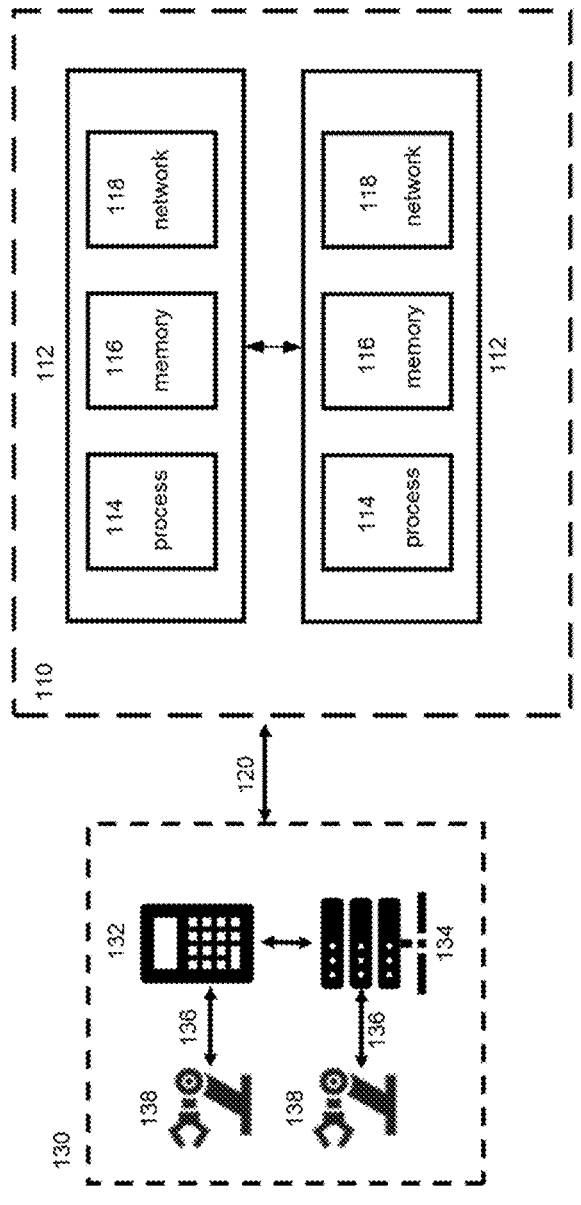
FIG. 1: a functional-block diagram of a cloud computing system for configuring industrial controllers via an SRA connection as disclosed herein.

The manufacturing industry has undergone a significant transformation in recent years with automation playing a critical role in driving growth and efficiency. Industrial automation devices such as Programmable Logic Controllers (PLCs), sensors, and Human-machine Interfaces (HMIs) have become increasingly sophisticated and complex, requiring manufacturers to monitor, control and adjust their production processes in realtime. However, with the increasing complexity of the programs running on those devices, the need for connecting to them remotely has become essential. Remote access allows manufacturers to troubleshoot issues, perform maintenance, and make adjustments to their equipment from anywhere, at any time. This results in significant cost savings, increased uptime, and improved overall efficiency.

For instance, system integrators working with manufacturers don't have to let their experienced engineer travel on site. Instead, they can help their customers remotely, thereby saving cost and improving their carbon footprint. As a result, manufacturers with their own automation engineering teams can increasingly source PLC engineers globally to work remotely, thus helping them to attract rare talent and reducing their own costs. Despite these benefits, enabling remote access to industrial automation devices can be challenging as it requires secure and reliable connections that do not compromise the security of any devices or production processes. The connectivity services/systems/methods disclosed herein address such challenges and provide a secure and efficient solution for PLC operators such as manufacturers and machine builders seeking to enable remote access to their industrial automation devices.

Enabling remote access to industrial automation devices presents a number of challenges to manufacturers. Some of these challenges include: Security concerns: Industrial automation devices often control critical production processes. Hence, security is a major concern. Remote access must be secure and not compromise the integrity of the devices or the production process. Legacy devices: Many manufacturers have legacy devices that are not designed to support remote access, making it difficult to enable this functionality without expensive hardware upgrades. In addition, those legacy devices have often not been patched. The complexity of network's architecture: The architecture of typical OT (Operational Technology) networks is quite complex due to their specialized nature and unique requirements. Devices are often split into many subnets and the OT network is separated from the enterprise network via a demilitarized zone (DMZ). Proprietary network communication protocols: Many industrial automation devices rely on proprietary software (e.g., TIA Portal by SIEMENS) with proprietary communication protocols that can make it difficult to establish secure remote connections to all devices via a single solution. Connectivity reliability: Remote access requires reliable and secure connections, which is challenging in areas with poor network coverage or unreliable internet connections. The connectivity service/systems and methods disclosed herein address these challenges by providing a secure solution that enables remote access to industrial automation devices, including legacy devices. The present disclosure enables usage of third-party communication protocols and works with existing devices meeting minimum system requirements to minimize the need for expensive hardware upgrades.

To address such and similar challenges as discussed above, the present disclosure generally provides a remote secure access connectivity from services/applications hosted in the cloud to industrial automation devices such as programmable logic controllers (PLCs) on the shop floor. The service leverages machine-to-machine communications, such as MQTT communications and establishes on-demand, device-specific remote secure access connections such as VPN tunnels, allowing manufacturers, machine builders and system integrators to securely connect remotely. All communications may be fully encrypted (e.g., using AES-256 over the RSA connection, e.g., a VPN tunnel), and different manufacturers are fully isolated from each other via tenant-specific connectivity host servers. In addition, manufacturers can use a dedicated connectivity client on existing gateway devices minimizing the need to install new and expensive hardware.

More specifically, in a first aspect, the present disclosure provides a method for establishing a secure remote access (SRA) connection between a cloud computing system (CCS), and an industrial automation system (IAS). The method comprises receiving, by an SRA server component of the CCS, a first SRA connection establishment message from a first SRA client component of the CCS or from a second SRA client component of a user device connected to the CCS, receiving, by an SRA orchestrator component of the CCS, an indication to establish the SRA connection between the CCS and the IAS, sending by the SRA orchestrator component and based at least in part on the indication, a machine-to-machine network protocol message to a third SRA client component of the IAS comprising information for establishing the SRA connection between the IAS and the CCS, receiving, by the SRA server component of the CCS, a second SRA connection establishment message from the third SRA client component of the IAS; and, establishing, via the SRA server component, the SRA connection between the first SRA client component of the CCS and the third SRA client component of the IAS or between the second SRA client component of the user device and the third SRA client component of the IAS.

In this manner, the CCS and the IAS can exchange sensitive information, such as new or updated PLC code or configurations in a secure and efficient manner, without the need for open inbound port at the IAS.

The SRA connection may, in some examples, comprise a VPN tunnel between the IAS (e.g., with or via one or more PLC networks, e.g., located at a (customer) site) and the CCS (e.g., implementing a corresponding cloud computing solution). The SRA connection (e.g., a VPN tunnel) may, e.g., be a short-lived connection and/or be established on demand (e.g., only when necessary). This approach may minimize exposure and may reduce potential attack surfaces by keeping the SRA connection inactive until required.

In some examples, the method may comprise adjusting at least one of the steps of the method to one or more parameters of the IAS, the CCS, the SRA connection, and/or the network via which the SRA connection is established. This adjusting may be configured to reduce a latency of the system, particularly the latency of the communication via the SRA connection between the CCS and the IAS Thereby, desired low-latency communication may be achieved.

The CCS and/or the cloud computing solution may, e.g., host logic configured to send commands to the IAS and/or one or more PLCs of the IAS for automated and/or command-based (e.g., manual and/or remote) control of the IAS and/or the one or more PLCs of the IAS.

In some examples, the method may further comprise enabling on-demand and/or automated actions from the CCS (e.g., implementing a corresponding cloud computing solution) to the IAS and/or a component thereof (e.g., one or more PLCs) via the SRA connection.

In a further aspect, the present disclosure provides a method for configuring an industrial controller of an industrial automation system (IAS) via a cloud computing system (CCS), comprising: generating a controller program and/or a controller configuration for the industrial controller, establishing a secure remote access (SRA) connection between the CCS and the IAS using the method described above (and in more detail below), and sending, using the established SRA connection, the generated controller program and/or controller configuration to the industrial controller.

In this manner, an industrial automation engineer can remotely reconfigure industrial controllers or even complete industrial automation systems remotely without compromising security of the industrial automation system. The configuring and/or reconfiguring may, e.g., comprise configuring and/or reconfiguring at least a part of the CCS and/or the IAS to execute one or more specific tasks on the IAS (e.g., a PLC system). The one or more specific tasks may, e.g., be executed based on one or more predetermined triggers and/or one or more (manual and/or remote) commands. For example, the automated action may be based on scheduled tasks and/or event-driven triggers. For example, if a specific sensor detects and/or reports an event (e.g., an abnormal condition), the CCS can automatically send a command to the IAS and/or the (corresponding) PLC associated with the event (e.g., the abnormal condition) to perform an action based thereon, e.g., to stop the affected machine and/or PLC.

In some examples, the method may further comprise implementing one or more authentication protocols and/or may further be based on one or more authentication protocols. The one or more authentication protocols may, e.g., comprise a multi-factor authentication. Multi-factor authentication may be used for all remote users. Thereby, it may be ensured that only authorized users may access the IAS. The authentication between the IAS (e.g., via a gateway) and the CCS may, e.g., be based on a certificate-based mechanism, with each user/customer being issued a unique certificate. This may ensure that all communication is highly secure and specific to each customer and gateway, further preventing unauthorized access or man-in-the-middle attacks by enforcing mutual TLS authentication for every connection established between the gateway and the CCS (e.g., the cloud solution).

The authentication may, e.g., result in granting an authorized user access to the system, e.g., as described herein. In some examples, all authenticated users may be given the same degree of access or, e.g., by means of a role-based access control (RBAC), differently authenticated users may be given different degrees of access to the system. The RBAC may, e.g., grant varying levels of control over the IAS (e.g., their PLCs) based on their role (e.g., an administrator may be given (almost) full access while an operator may be given limited access).

The method may, in some examples, further comprise detecting an intrusion and/or providing a firewall. Accordingly, the system described herein may, in some examples, comprise one or more firewalls and/or one or more intrusion detection systems (IDS) to protect the system (e.g., the PLC network as described herein) from unauthorized access.

The method may, in some examples, further comprise monitoring and/or logging of all or selected user activities and cloud-to-PLC interactions (e.g., interactions over the SRA connection), e.g., for auditing purposes.

The present disclosure also relates to a corresponding computer program and a corresponding cloud computing system. Further details and technical advantages are discussed below with reference to the drawings.

In the following, some exemplary embodiments of the present disclosure described in more detail, with reference to exemplary processes and computing systems. Naturally, the computing systems provided by the present disclosure may employ standard hardware components (e.g., cloud compute nodes or servers connect to each other via conventional wired or wireless networking technology). In some implementations, application-specific hardware may also be employed. Further, such computing systems are configured to execute software instructions (e.g., retrieved from collocated or remote non-transitory memory circuitry) to execute the computer-implemented methods disclosed herein.

While specific feature combinations are described in the following paragraphs with respect to exemplary embodiments of the present disclosure, it is to be understood that not all features of the discussed embodiments have to be present for realizing the disclosure, which is defined by the subject matter of the claims. The disclosed embodiments may be modified by combining certain features of one example embodiment with one or more technically and functionally compatible features of other exemplary embodiments. Specifically, the skilled person will understand that features, components, processing steps and/or functional elements of one exemplary embodiment can be combined with technically compatible features, processing steps, components and/or functional elements of any other exemplary embodiment of the present disclosure as long as covered by the specifications of provided by the appended claims.

Moreover, the various embodiments discussed herein can be implemented in hardware, software or a combination thereof. For instance, the various components, elements, subsystems, modules, etc. of the systems disclosed herein may also be implemented via application specific software being executed on multi-purpose data and signal processing equipment such as servers, compute nodes, CPUs, DSPs and/or systems on a chip, SOCs, or similar components or any combination thereof. Some implementations also employ application specific hardware components such as application specific integrated circuits, ASICs, and/or field programmable gate arrays, FPGAs, and/or similar components and/or any combination thereof. For instance, the various computing (sub)-systems discussed herein may be implemented, at least in part, on multi-purpose data processing equipment such as cloud and/or edge computing servers.

FIG. 1 shows a functional block diagram illustrating system architecture, functions and operation of a cloud computing system (CCS) 110 according to an aspect of the present disclosure. As discussed herein, the cloud computing system 110 may comprise one or more cloud compute nodes 112, each providing (e.g., virtualized) processing resources 114, memory resources 116 and networking resources 118 for cloud-based distributed execution of cloud computing software. The cloud compute nodes 112 are configured to receive and to transmit, via a network 120 (e.g., an IP-based network such as the internet), data from and to controllers 132 of an industrial automation system 130 and, optionally, from and to one or more sensors monitoring operation of the industrial automation system 130. The industrial automation system 130 may also comprise (or may be connected to) edge computing equipment 134 (e.g., one or more edge computing nodes executing edge computing software) that may be configured for hosting virtualized and preferably containerized virtual industrial controllers as discussed in WO2023/198280 A1—incorporated herein in its entirety. The industrial automation system 130 may also comprise hardware-based industrial controllers 132 such as PLCs.

The virtual and hardware-based controllers of the industrial automation system 130 may be connected via real-time capable industrial automation networking technology 136 to actuators 138 and sensors of the industrial automation system 130. As also discussed herein, the cloud compute nodes 112 are configured to execute cloud computing software to configure the controllers of the industrial automation system 130, via the network 120, by performing methods as discussed herein. In particular, the network 120 may be used to establish a secure remote access (SRA) connection from the CCS 110 to the IAS 130 as discussed below with reference to FIG. 3 and to securely (re-) configure the IAS using the established SRA connection as discussed below with reference to FIG. 4.

Figure 2:
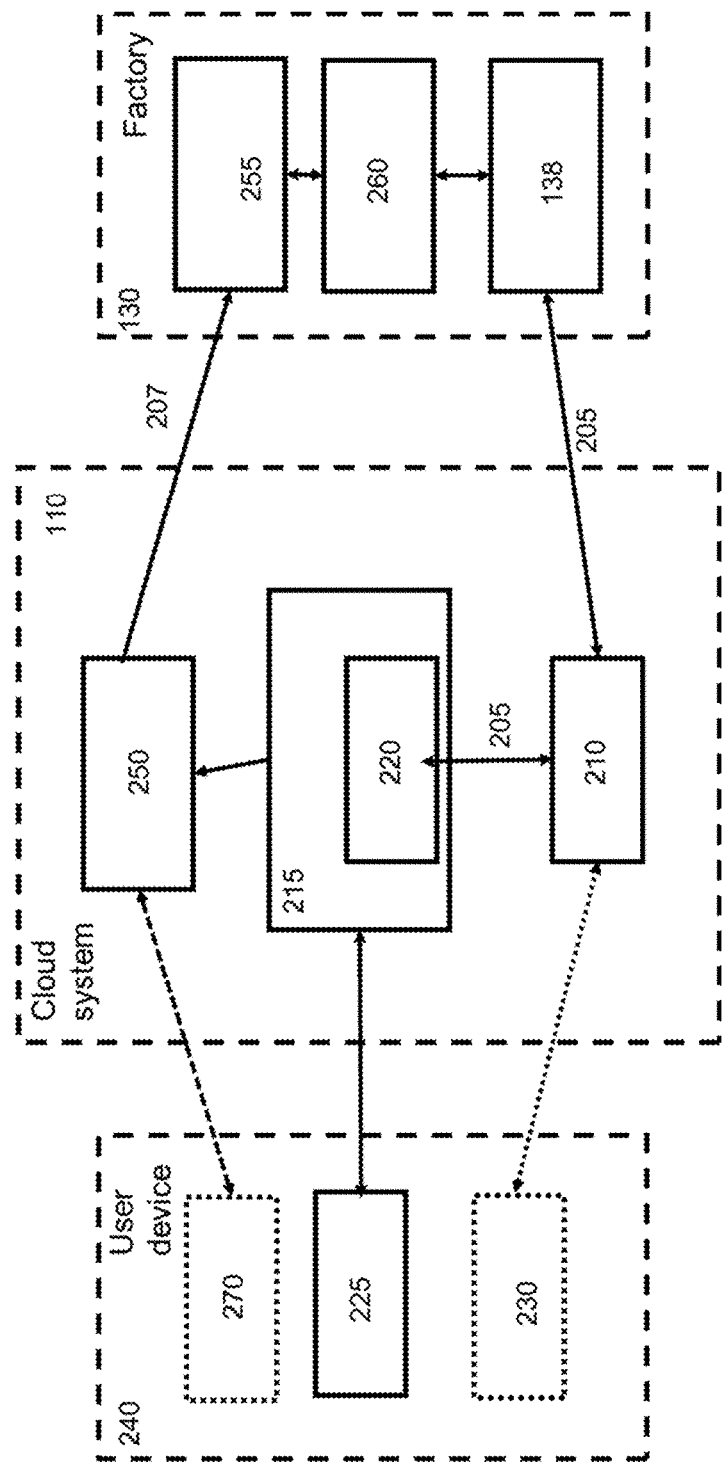
FIG. 2: a functional-block diagram of an implementation of a computing system configured for establishing an SRA connection to an industrial automation system as disclosed herein.

FIG. 2 illustrates a functional-block diagram of an implementation of a computing system configured for establishing an SRA connection 205 between a CCS 110 to an IAS 130 e.g., an IAS 130 of a factory or manufacturing plant as disclosed herein. In a typical application scenario, a user device 240 remotely operates (e.g., via a web browser 225) a cloud-hosted application software component 215 (e.g., an IDE as a service application) that may include or be operably interfaced with a first SRA client component 220 which in turn may exchange data with an SRA server component 210 as discussed below. Alternatively or additionally, the SRA server component 210 may also exchange data with a second SRA client component 230 on the user device 240.

The CCS 100 may further comprise a connection orchestrator component 250 that may exchange data with the application software component 215 and, as discussed below, with a third SRA client component 260 of the IAS,-e.g., via a machine-to-machine interface 207, such as a MQTT connection. Alternatively or additionally, the connection orchestrator component 250 may also exchange data with the user device 240, e.g., with a user connectivity service client 270. The IAS 130 may further comprise a factory connectivity service client 255 (e.g., executed on edge computing hardware) and industrial controllers 138 (robot controllers, PLCs, virtual PLCs, etc.). The CCS 110 may thus comprise means (e.g., implemented in hard-or software or a combination thereof) to carry out methods as discussed below with reference to FIG. 3 and FIG. 4.

FIG. 3 illustrates a process flow diagram of a method for establishing an SRA connection between a CCS 110 and an IAS 130 as discussed above. Step 310 comprises receiving, by an SRA server component of the CCS, a first SRA connection establishment message from a first SRA client component of the CCS or from a second SRA client component of a user device connected to the CCS. Step 320 comprises receiving, by a connection orchestrator component of the CCS, an indication to establish the SRA connection between the CCS and the IAS and step 330 comprises sending, by the connection orchestrator component and based at least in part on the indication, a machine-to-machine network protocol message to a third SRA client component of the IAS comprising information for establishing the SRA connection between the IAS and the CCS. Step 340 comprises receiving, by the SRA server component of the CCS, a second SRA connection establishment message from the second SRA client component of the IAS. Step 350 comprises establishing, via the SRA server component, the SRA connection between the first SRA client component of the CCS and the third SRA client component of the IAS or between the second SRA client component of the user device and the third SRA client component of the IAS. In this manner, the IAS 130 does not need to comprise open inbound ports for establishing the SRA connection between CCS and IAS.

In some implementations, receiving, by the SRA orchestrator component of the CCS, the indication to establish the SRA connection between the CCS and the IAS may comprises receiving, via an application programming interface, the indication to establish the SRA connection from the user device connected to the CCS, or receiving the indication to establish the SRA connection from an application software component of the CCS used by the user device connected to the CCS. Further, the machine-to-machine network protocol message may comprise an MQTT message or a similar message.

Further, the SRA connection may comprise a virtual private network, VPN, connection, and the first, the second and the third SRA client component may comprise a VPN client component and the SRA server component may comprise a VPN server component. In other implementations, the SRA connection may comprise a secure shell, SSH, port forwarding connection, and the first, the second and the third SRA client component may comprise an SSH client component, and the SRA server component may comprise an SSH server component. In some implementations, the method disclosed herein may further comprise receiving, by the CCS, a request for establishing the SRA connection between the CCS and the IAS and, optionally, the SRA server component may comprise a tenant-specific server component, and optionally the method may further comprise instantiating the SRA server component in response to receiving the a request for establishing the SRA connection between the CCS and the IAS.

Figure 4:
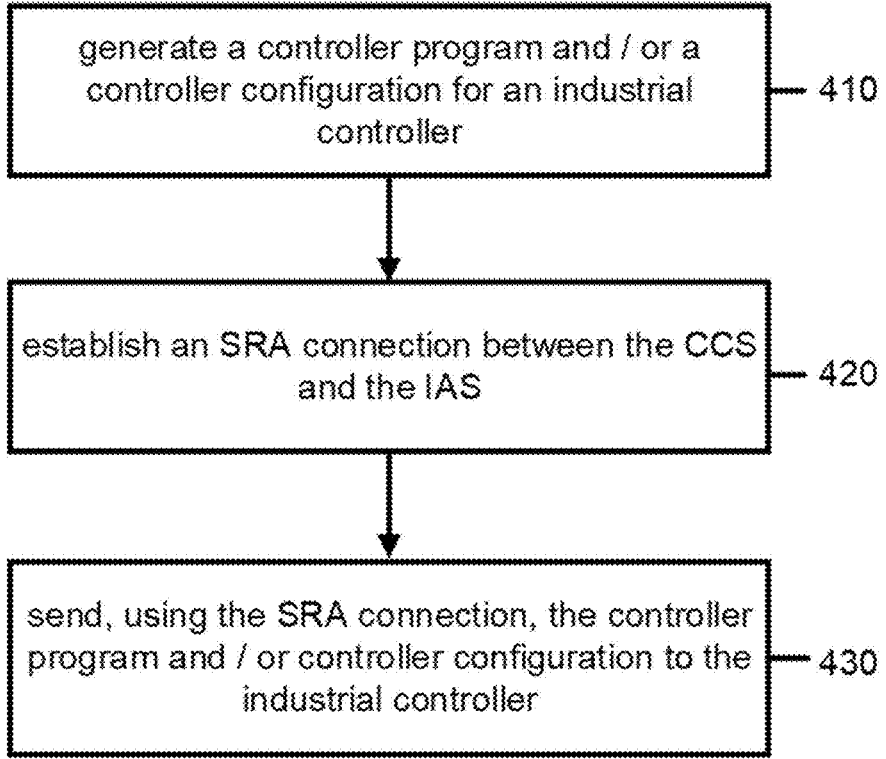
FIG. 4: a process flow diagram of a method for configuring an industrial controller of an IAS using an SRA connection as disclosed herein.

FIG. 4 illustrates a process flow diagram of a method for configuring an industrial controller of an IAS using an SRA connection as disclosed herein. Step 410 comprises generating a controller program and/or a controller configuration for the industrial controller, and step 420 establishing a secure remote access, SRA, connection between the CCS and the IAS using the method as discussed with reference to FIG. 3. Step 430 comprises sending, using the established SRA connection, the generated controller program and/or controller configuration to the industrial controller (see FIG. 2 for an example system configuration). In some implementations, the method of FIG. 4 may further comprise establishing a connection between a user device and an integrated development environment (IDE) of the CCS (e.g., for streaming the IDE in a web browser), and using the IDE for generating the controller program and/or the controller configuration.

The secure connectivity service/system/method provided herein thereby enables secure remote access from cloud-hosted automation applications to industrial automation devices on the shop floor. The service utilizes MQTT or similar protocols for base communication and opens additional encrypted communication channels on demand such as a device-specific VPN tunnel, e.g., to enable remote deployment of program code and/or configurations to industrial controllers, e.g., PLCs or similar automation assets. Some of the key features and benefits of the disclosed secure connectivity service include:

(1) Secure connections: All communications may be fully encrypted and do not require any open inbound ports.

(2) Support for legacy third-party software: The disclosed services support legacy third-party software enabling manufacturers to continue using their existing software tools.

(3) Compatibility with existing gateway devices: Modules of the service disclosed herein can be installed on existing gateway devices, minimizing the need for expensive hardware upgrades.

(4) Secure tenant isolation: The disclosed services and system architecture (see FIG. 2) allows to strictly separates traffic between different tenants within its cloud architecture. For every tenant a dedicated connectivity host server may be instantiated that all traffic may be routed to.

(5) Comprehensive permission management: The present disclosure allows manufacturers to have full control over who of their users can access which device. In addition, they can enable temporary access for third parties (e.g., system integrators) to perform changes on specific devices (e.g., access to just one PLC for maximally 3 hours, etc.).

(6) No connection from unsecured engineering workstations: The disclosed secure connectivity service/methods/systems allow restricting connections to be only between secured cloud servers and manufacturer's automation devices. Direct access of unsecured engineering workstations (e.g., from system integrators) to automation devices can thereby be avoided.

(7) Multi-protocol support: The connectivity service/methods/systems disclosed herein support multiple communication channels that are opened on-demand. For instance, many PLCs can be accessed and updated using port forwarding such that there is no need to establish a VPN tunnel to manage those devices remotely. (8) State-of-the-art VPN tunnel on-demand only: In case a VPN tunnel is needed for communication with a specific device, the service opens temporary, device-specific, and encrypted VPN tunnels on demand only, such that no permanent VPN connections are established. The VPN technology may be based on WireGuard.

(8) Nested gateway devices: The disclosed embodiments provide the capability to use nested gateway setups within the on-premise network 136 for increased security. In this case, there might be a parent gateway with multiple sub-gateway devices.

Figure 5:
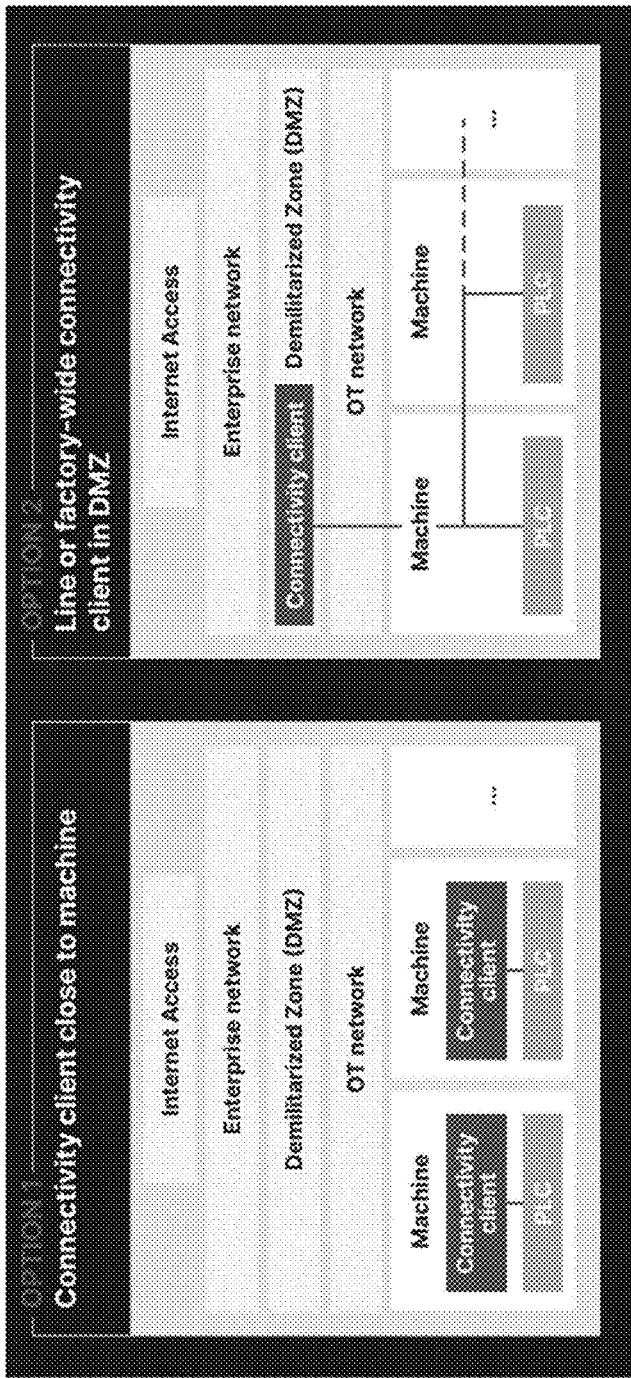
FIG. 5: different options to arrange multiple connectivity client within an on-premise network.

In some implementations, there are multiple options to place connectivity clients within a given network infrastructure. Important boundary conditions are that the gateway needs to be able to communicate with the respective automation devices via their proprietary protocols and have outbound internet access to selected domains associated with the CCS. For example, a connectivity client may be placed inside a demilitarized zone (see FIG. 5). In other implementations, the connectivity client may be placed inside an OT (sub) network. Users can also use multiple gateway instances in their networks (e.g., in different OT subnets to enable nested gateway setups-e.g., a parent client inside the DMZ and nested clients inside the OT subnets.

Figure 6:
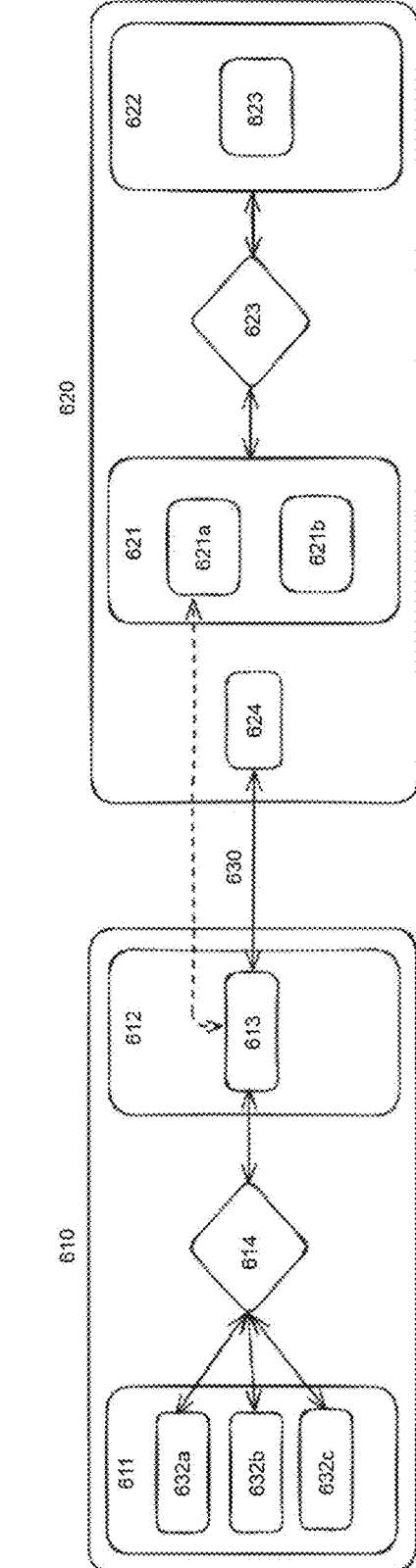
FIG. 6: an exemplary system with four subnets.

FIG. 6 shows an exemplary system 600 with four subnets 611, 612, 621, 622. The system 600 comprises two portions: an on premise network environment 610 and a cloud solution network environment 620. The on premise network environment 610 comprises the first subnet 611 comprising a plurality of PLCs 632a, 632b, 632c (in the example of FIG. 6, there are three PLCs but in other embodiments there may be any other number of PLCs including 0, 1, 2, 3, 4, . . . . PLCs). Further, the on premise network environment 610 comprises the second subnet 612 comprising a gateway 613. The first subnet 611 and the second subnet 612 are connected via a router 614, via which a connection between the gateway 613 and one or more of the PLCs 632a, 632b, 632c may be established.

To access one or more PLCs 632a, 632b, 632c via the router 614, the system 600 may execute one or more of the following steps: It may be ensured that each PLC 632a, 632b, 632c has a unique IP address within the same subnet. This may allow the router 614 to distinguish between the different PLCs 632a, 632b, 632c. The router 614 may connect to the PLCs 632a, 632b, 632c using Ethernet cables and/or other connections. The router 614 may be configured to handle the IP addresses of all connected PLCs 632a, 632b, 632c. As the PLCs 632a, 632b, 632c are to be accessed from outside the local) on premise network environment 610 (e.g., via the internet), port forwarding may be set up on the router 614. E.g., a unique external port may be assigned for each PLC 632a, 632b, 632c and mapped to the internal IP address (as described herein) and port of the corresponding PLC 632a, 632b, 632c. Optionally, the router's 614 firewall settings may be adjusted to allow traffic to and from the PLCs 632a, 632b, 632c, e.g., as described herein. E.g., a distinct step may be dedicated to ensuring that the necessary ports are open for communication (e.g., communication as described herein).

The cloud solution network environment 620 comprises the third subnet 621 comprising servers (e.g., VPN servers) of a first tenant 621a and of a second tenant 621b (in the example of FIG. 6, there are two tenant servers but in other embodiments there may be any other number of PLCs including 0, 1, 2, 3, 4, . . . tenant servers). The cloud solution network environment 620 further comprises the fourth subnet 622 comprising a cloud solution backend 623 (e.g., implemented by the CCS). The third subnet 621 and the fourth subnet 622 are connected via a router 623, via which a connection between the cloud solution backend 623 and one or more of the tenant servers 621a, 621b may be established.

The on premise network environment 610 and the cloud solution network environment 620 may establish a connection between one another upon successful authentication and/or authorization (e.g., of at least one of the tenant servers 621a, 621b at the gateway 613. For authentication 630, the method may implement one or more authentication protocols and/or may further be based on one or more such authentication protocols. In the example of FIG. 6, authentication and/or authorization 630 comprises authorization of the process by means of a MQTT broker 624 (in the example of FIG. 6 located in the cloud solution network environment 620). The authentication and/or authorization 630 may, e.g., comprise a multi-factor authentication. In result, the implementation of MQTT or similar protocols may allow to open/establish connections between the on premise network environment 610 and the cloud solution network environment 620 on demand. The SRA connection established therefor may comprise, e.g., a device specific VPN tunnel, e.g., to enable remote deployment of program code and/or configurations to industrial controllers, as described herein.

In other example, the system 600 may be structured differently than shown in FIG. 6 (e.g., comprising more, less, and/or different subnets 611, 612, 621, 622).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a secure remote access (SRA) connection between a cloud computing system (CCS) and an industrial automation system (IAS) comprising actuators and sensors of a factory or manufacturing plant, the method comprising:

receiving, by an SRA server component of the CCS, a first SRA connection establishment message from a first SRA client of the CCS or from a second SRA client of a user device connected to the CCS;

receiving, by a connection orchestrator component of the CCS, an indication to establish the SRA connection between the CCS and the IAS;

sending, by the connection orchestrator component of the CCS and based at least in part on the indication, a machine-to-machine network protocol message to a third SRA client of the IAS comprising information for establishing the SRA connection between an industrial controller of the IAS and the CCS;

receiving, by the SRA server component of the CCS, a second SRA connection establishment message from the third SRA client of the IAS; and establishing, via the SRA server component of the CCS, the SRA connection between the first SRA client of the CCS and the industrial controller of the IAS or between the second SRA client of the user device and the industrial controller of the IAS.

2. The method of claim 1, wherein receiving, by the SRA orchestrator component of the CCS, the indication to establish the SRA connection between the CCS and the IAS comprises:

receiving, via an application programming interface, the indication to establish the SRA connection from the user device connected to the CCS; or receiving the indication to establish the SRA connection from an application software component of the CCS used by the user device connected to the CCS.

3. The method of claim 1, wherein the machine-to-machine network protocol message comprises an MQTT message.

4. The method of claim 1, wherein the SRA connection comprises a virtual private network (VPN) connection; and wherein the first, the second and the third SRA client comprise a VPN client and wherein the SRA server component comprises a VPN server component.

5. The method of claim 1, wherein the SRA connection comprises a secure shell (SSH) port forwarding connection; and wherein the first, the second and the third SRA client comprise a SSH client and wherein the SRA server component comprises a SSH server component.

6. A cloud computing system comprising one or more hardware processors configured to execute the method of claim 1.

7. A non-transitory computer-readable medium containing a computer program comprising instructions which, upon being executed by one or more processors of a cloud computing system, provide for execution of the steps of claim 1.

8. The method of claim 1, wherein the CCS hosts logic configured to send commands to the industrial controller of the IAS for automated and/or command-based control of the industrial controller to execute on or more specific tasks on the IAS.

9. The method of claim 8, wherein the CCS is configured to automatically send a command to the industrial controller in response to an event or condition reported by one of the sensors of the IAS.

10. The method of claim 1, wherein the connection orchestrator component of the CCS sends the machine-to-machine network protocol message to the third SRA client of the IAS via a factory connectivity service client of the IAS.

11. The method of claim 10, wherein the factory connectivity service client is disposed inside a demilitarized zone of the IAS.

12. The method of claim 10, wherein the factory connectivity service client is disposed inside an operational technology sub-network of the IAS.

13. The method of claim 10, wherein the machine-to-machine network protocol message is transmitted by a MQTT machine-to-machine network interface connection.

14. The method of claim 1, wherein the industrial controller is a robot controller.

15. A method for configuring an industrial controller of an industrial automation system (IAS) via a cloud computing system (CCS), the method comprising:

generating a controller program and/or a controller configuration for the industrial controller;

establishing a secure remote access (SRA) connection between the CCS and the IAS by:

receiving, by an SRA server component of the CCS, a first SRA connection establishment message from a first SRA client of the CCS or from a second SRA client of a user device connected to the CCS;

receiving, by a connection orchestrator component of the CCS, an indication to establish the SRA connection between the CCS and the IAS;

sending, by the connection orchestrator component of the CCS and based at least in part on the indication, a machine-to-machine network protocol message to a third SRA client of the IAS comprising information for establishing the SRA connection between the industrial controller of the IAS and the CCS;

receiving, by the SRA server component of the CCS, a second SRA connection establishment message from the third SRA client of the IAS; and establishing, via the SRA server component of the CCS, the SRA connection between the first SRA client of the CCS and the industrial controller of the IAS or between the second SRA client of the user device and the industrial controller of the IAS; and sending, using the established SRA connection, the generated controller program and/or controller configuration to the industrial controller.

16. The method of claim 15, further comprising:

establishing a connection between a user device and an integrated development environment of the CCS; and using the integrated development environment for generating the controller program and/or the controller configuration.

* * * * *